(12) United States Patent
Vogt et al.

(10) Patent No.: US 6,238,471 B1
(45) Date of Patent: May 29, 2001

(54) INTERFERENCE PIGMENTS HAVING A BLUE MASS TONE

(75) Inventors: Reiner Vogt; Hans-Dieter Brückner, both of Darmstadt (DE)

(73) Assignee: Merck Patent Gesellschaft mit beschrankter Haftung (DE)

( * ) Notice: Subject to any disclaimer, the term of this patent is extended or adjusted under 35 U.S.C. 154(b) by 0 days.

(21) Appl. No.: 09/241,283

(22) Filed: Feb. 1, 1999

(30) Foreign Application Priority Data

Jan. 30, 1998 (DE) .............................. 198 03 550

(51) Int. Cl.[7] .............................. C09C 1/00; C09C 1/04; C09C 1/22; C09C 1/24; C09C 1/36
(52) U.S. Cl. .................. 106/417; 106/436; 106/437; 106/439; 106/440; 106/479; 106/480
(58) Field of Search ..................................... 106/417, 436, 106/437, 439, 440, 479, 480

(56) References Cited

U.S. PATENT DOCUMENTS 5,958,125  *  9/1999  Schmid et al. ...................... 106/417

* cited by examiner

*Primary Examiner*—Mark L. Bell
*Assistant Examiner*—Michael J. DiVerdi
(74) *Attorney, Agent, or Firm*—Millen, White, Zelano & Branigan, P.C.

(57) ABSTRACT

Multilayer interference pigment having a blue mass tone, comprised of a platelet-shaped carrier material and a coating which is formed from (i) a first layer of a colorless, transparent metal oxide of high refractive index,
(ii) a second layer of colorless, transparent metal oxide of low refractive index and
(iii) a third, outer layer of cobalt aluminate, cobalt-containing glass, tungsten bronzes or cobalt oxide, it also being possible for the first and third layer to be swapped around.

26 Claims, No Drawings

INTERFERENCE PIGMENTS HAVING A BLUE MASS TONE

BACKGROUND OF THE INVENTION

The invention relates to multilayer interference pigments having a blue mass tone.

Colored interference pigments are already known. They contain either colorant additives or coloring metal oxides, the latter possibly also forming the layer which produces interference colors. The play of colors brought about by this means is limited in nature. In particular, pigments with blue or bluish colors have not to date been obtainable in a satisfactory shade. The selection of desired colors is also restricted, in addition, because colorants may greatly reduce the chemical and thermostability of the interference pigments.

U.S. Pat. No. 3,951,679 describes colored pigments based on mica which is coated with metal oxide layers and may additionally carry a colored coating of Prussian Blue. The layer of Prussian Blue is formed by the reaction of an iron compound that has been deposited on the substrate with a water-soluble hexacyanoferrate. This pigment has the disadvantage that the Prussian Blue decomposes at a temperature of 200 to 300° C.

U.S. Pat. No. 4,968,351 describes a pearl luster pigment which is colored by means of an adsorbed colorant, a color lake being applied to the colorant layer in order to intensify the adsorption of the colorant. A disadvantage of this pigment is that on contact with organic solvents the organic colorant is separated from the interference pigment. Moreover, the organic colorant impairs the weathering stability of the pigment. U.S. Pat. No. 5,169,442 describes a blue-green pigment consisting of a substrate comprising mica coated with metal oxide and of a top layer formed from a mixed oxide of magnesium oxide, calcium oxide, cobalt oxide and titanium dioxide. The mass tone of this pigment, however, is not pure blue.

SUMMARY OF THE INVENTION

It is the object of the object of the invention to provide interference pigments having a blue mass tone which possess the light stability, chemical stability and weathering stability of customary commercial interference pigments.

This object is achieved in accordance with the invention in a first embodiment by multilayer interference pigments having a blue mass tone, also referred to as "mass colour" (see Plastics Technical Dictionary, p. 196, by Wittfoht) comprised of a platelet-shaped carrier material and a coating which is formed from (i) a first layer of a colorless, transparent metal oxide of high refractive index,
(ii) a second layer of colorless, transparent metal oxide of low refractive index and
(iii) a third, outer layer of cobalt aluminate, cobalt-containing glass, tungsten bronzes or cobalt oxide.

This object is additionally achieved in accordance with the invention in a second embodiment by multilayer interference pigments having a blue mass tone, comprised of a platelet-shaped carrier material and a coating which is formed from (i) a first layer of cobalt aluminate, cobalt-containing glass, tungsten bronzes or cobalt oxide,
(ii) a second layer of colorless, transparent metal oxide of low refractive index and
(iii) a third, outer layer of a colorless, transparent metal oxide of high refractive index.

This object is also achieved in accordance with the invention by a process for preparing the pigments according to the invention, in which the platelet-shaped carrier material is suspended in water and the suspension is heated at 50 to 100° C., a water-soluble metal compound is added at a pH which is appropriate for hydrolysis, so that a metal oxide hydrate of high refractive index is precipitated onto the suspended particles, the pH required for the precipitation of the respective metal oxide hydrate being established and kept constant by simultaneous addition of acid or base, subsequently the pH is adjusted with a base to 4 to 10 and a water-soluble metal compound is added, so that a metal-oxide hydrate of low refractive index is precipitated onto the suspended particles, the pH being kept constant by simultaneous addition of acid or base, and subsequently the resulting product is washed, dried at from 60 to 180° C. and calcined at from 500 to 1100° C., then the product is suspended in water and is coated at a pH of from 3 to 10 with cobalt and aluminium oxide hydrate by addition and hydrolysis of the corresponding water-soluble metal compounds, the pH being kept constant by simultaneous addition of a base, and and subsequently the product is washed, dried and from 60 to 180° C. and calcined at from 500 to 1100° C.

This object is also achieved in accordance with the invention by a process for preparing the pigments according to the invention, in which the platelet-shaped carrier material is suspended in water and the suspension is heated to 50 to 100° C. and is coated at a pH of from 3 to 10 with cobalt and aluminium oxide hydrate by addition and hydrolysis of the corresponding water-soluble metal compounds, the pH being kept constant by simultaneous addition of base, subsequently the pH is adjusted with a base to 4 to 10 and a water-soluble metal compound is added, so that a metal-oxide hydrate of low refractive index is precipitated onto the suspended particles, the pH being kept constant by simultaneous addition of acid or base, and then a water-soluble metal compound is added at a pH suitable for hydrolysis, so that a metal oxide hydrate of high refractive index is precipitated onto the suspended particles, the pH required for the precipitate of the respective metal oxide hydrate being established and kept constant by simultaneous addition of acid or base, and subsequently the product is washed, dried at from 60 to 180° C. and calcined at from 500 to 1100° C.

The invention also relates to the use of the pigments according to the invention for pigmenting paints.

For this purpose they can be employed as mixtures with customary commercial pigments, examples being inorganic and organic absorption pigments, metal-effect pigments (see Special Effect Pigments, Ed. Urich Zoril, p. 13) and LCP (Liquid Crystal Polymer) pigments (see U.S. Pat. No. 5,824,733).

Suitable carrier materials for the pigments according to the invention are natural or synthetic, platelet-shaped materials which have no inherent color. Preferred carrier materials are phyllosilicates, metal oxide platelets and glass flakes and ceramic flakes. Particular preference is given to mica, talc, kaolin, synthetic mica, and aluminium oxide and silicon dioxide platelets.

The silicon dioxide platelets are produced in accordance with International Application WO 93/08 237 on a continuous belt by solidification and hydrolysis of a waterglass solution.

The size of the carrier materials is not critical and can be matched to the particular intended use. In general, the platelet-shaped carrier materials have a thickness of between 0.05 and 5 µm, in particular between 0.2 and 2.0 µm. The extent in the two other dimensions is usually between 2 and 100 µm and, in particular, between 5 and 50 µm.

The thickness of the individual layers of the pigment is essential for the optical properties of the pigment. For a pigment with intense interference colors, the thickness of the individual layers must be adapted to one another. Furthermore it is possible, through an appropriate choice of layer thicknesses, to achieve a particularly strong variation in color as a function of the viewing angle. This is achieved, for example, by the precipitation of a thick $SiO_2$ layer (layer thickness>100 nm), giving pigments having a strongly pronounced angular dependence of the interference colors. Adjustment of the layer thicknesses to produce a given desired effect can be achieved with routine experimentation as is conventional in the art.

The thicknesses of the individual layers of the pigments according to the invention are preferably within the following ranges:

| Metal oxide of high refractive index: | 70–110 nm |
| --- | --- |
| Metal oxide of low refractive index: | 60–110 nm |
| Color-imparting layer: | 50–90 nm |

This gives rise, for example, to the following preferred proportions for the individual constituents of one pigment according to the invention:

25–40% by weight of carrier material
0.1–3% by weight of $SnO_2$
20–40% by weight of $TiO_2$ (metal oxide of high refractive index)
10–20% by weight of $SiO_2$ (metal oxide of low refractive index)
10–35% by weight of $CoAl_2O_4$ The tin dioxide serves only to induce the rutile modification when titanium dioxide is used for the 1st layer. It is precipitated directly onto the carrier material. This technique is described in more detail in U.S. Pat. No. 4,867,794.

The metal oxide layers are preferably applied by a wet-chemical method, it being possible to employ the wet-chemical coating techniques developed for the preparation of pearl luster pigments; techniques of this kind are described, for example, in DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017 or else in further patent documents and other publications.

For coating, the substrate particles are suspended in water, and one or more hydrolyzable metal salts are added at a pH which is appropriate for hydrolysis and is chosen such that the metal oxides and/or metal oxide hydrates are precipitated directly onto the particles without any instances of secondary precipitation. The pH is kept constant usually by simultaneous metered addition of a base.

Coating may also take place, furthermore, by gas phase coating in a fluidized-bed reactor, it being possible, for example, to apply the processes proposed in EP 0 045 851 and EP 0 106 235 for preparing pearl luster pigments.

As metal oxide of the high refractive index use is preferably made of titanium dioxide, chromium oxide, iron oxide, zinc oxide, zirconium dioxide, tin oxide or mixtures thereof, preference being given to titanium dioxide. As the metal oxide of low refractive index use is preferably made of silicon dioxide, boron oxide, aluminium oxide or mixtures thereof, particular preference being given to silicon dioxide. Materials with a low refractive index typically have values in the range of 1.35 to 1.80.

For the application of the titanium dioxide layers preference is given to the technique described in U.S. Pat. No. 3,553,001. An aqueous titanium salt solution is added slowly to a suspension, heated to about 50–100° C., especially 70–80° C., of the material to be coated, and a substantially constant pH of about 0.5–5, in particular about 1.5–2.5, is maintained by simultaneous metered addition of a base, for example aqueous ammonia solution or aqueous alkali metal hydroxide solution. As soon as the desired layer thickness of the $TiO_2$ precipitation has been reached, the addition of the titanium salt solution and of the base is stopped.

This process, also termed the titration process, is notable for the fact that it avoids an excess of titanium salt. This is achieved by supplying to the hydrolysis only that quantity per unit time which is necessary for uniform coating with the hydrated $TiO_2$ and which can be received per unit time by the available surface area of the particles to be coated. There is therefore no production of hydrated titanium dioxide particles not precipitated on the surface to be coated.

For the application of the silicon dioxide layers, the following process is to be employed: A sodium silicate solution is metered into a suspension, heated to 50–100° C., especially 70–80° C., of the material to be coated. The pH is held constant at 4 to 10, preferably 6.5 to 8.5, by simultaneous addition of 10% hydrochloric acid. Stirring is carried out for a further 30 minutes following addition of the silicate solution.

The precipitation of aluminium oxide hydrate on platelet-shaped materials is known from U.S. Pat. No. 4,084,983. The material is suspended in water, and this suspension is judiciously heated to relatively high temperatures, for example between 40 and 95° C. Then an aqueous acidic solution of a water-soluble aluminium salt, for example aluminium chloride, aluminium nitrate, potassium aluminium sulphate or aluminium sulphate, or an aqueous-alkaline solution of an aluminate, for example sodium aluminate or potassium aluminate, is run into the suspension. The concentration of Al ions in the salt solution running in is between 0.1 and 5 mol/l. At the same time, alkali or acid is added in order to establish a pH of between 3 and 10, preferably between 4 and 9. A suitable alkali comprises, in particular, alkali metal hydroxides and ammonium hydroxides, preferably aqueous NaOH or gaseous $NH_3$. In the case of addition of acid preference is given to $HC_1$, $H_2SO_4$ or $HNO_3$.

The addition of the alkali or acid is regulated such that the pH of the suspension remains as constant as possible during the precipitation.

The precipitation of cobalt oxide hydrate is described in more detail in EP 0 342 533. It takes place at a pH of 4 to 9. Since the precipitation conditions of cobalt oxide hydrate and aluminium oxide hydrate are virtually identical, co-precipitation of both oxide hydrates is possible.

If cobalt oxide is used as a color-imparting layer, then cobalt oxide hydrate is likewise precipitated by the process described above.

If a cobalt-containing glass is employed as the color-imparting layer, the procedure is as follows:

Cobalt oxide hydrate and silicon oxide hydrate are co-precipitated as a mixed precipitate onto the carrier material, as a first or third layer, under the conditions set out above. In this case, the glass structure forms in the course of the calcining of the product.

Tungsten bronzes of the general formula $M_xWO_3$, where M=alkali or alkaline earth metal, can likewise be used as the color-imparting layer. The alkali metal tungstates deposited on the carrier material are subsequently reduced with hydrogen or another appropriate reducing agent to such an extent that a compound of the formula $M_{0.3}WO_3$ is formed. These tungstates are an intense blue-violet in color.

It is additionally possible to subject the finished pigment to an aftercoating or aftertreatment process which further increases the light stability, weather stability and chemical stability, or which facilitates the handling of the pigment, especially its incorporation into different media. Suitable after coating and after treatment processes are those described, for example, in DE-C 22 15 191, DE-A 31 51 354, DE-A 32 35 017 or DE-A 33 34 598.

EXAMPLES

Example 1

100 g of mica (10–60 μm) are suspended in 2 l l of deionized water and the suspension is heated to 75° C. with stirring. A pH of 1.8 is established with dilute HCl, and a solution of 3.2 g of $SnCl_4 \cdot 5H_2O$ and 10 ml of 37% HCl in 50 ml of deionized water is metered in at a rate of 2 ml/min. During the addition the pH is kept constant with 32% NaOH. After 30 minutes of stirring, 450 ml of $TiCl_4$ solution (400 g/l) are metered in likewise at a rate of 2 ml/min. The pH is kept constant by simultaneous addition of 32% NaOH. The pH is subsequently adjusted to 7.0 with NaOH and the mixture is stirred for 30 minutes. Now a water glass solution (135 g of water glass, 27% relative to $SiO_2$, diluted with 135 g water) is metered in a rate of 2 ml/min, the pH is kept constant by adding 10% HCl . After the end of addition, stirring is carried out for 10 minutes at 75° C. Thereafter, the suspension is filtered with suction and the solid product is washed free of salt with deionized water and is dried at 110° C. After subsequent calcining at 800° C. for 30 minutes the product is sieved and resuspended in 2 l of deionized water. The pH is adjusted to 7.5 with NaOH and kept constant during the addition of a solution of 132 g of $Co(NO_3)_2 \cdot 6H_2O$ and 218 g of $AlCl_3 \cdot 6H_2O$ in 1200 ml of dionized water, added at a rate of 2 ml/min. The suspension is subsequently stirred for 30 minutes and filtered with suction, and the solid product is washed free of salt with deionized water and is dried at 110° C. The dried product is subsequently calcined at 1000° C. for 30 minutes and, after cooling, is sieved. 290 g of a gold interference pigment having a blue mass tone are obtained. According to X-ray structural analysis, the pigment according to the invention consists of mica $TiO_2$ in the rutile modification and $CoAl_2O_4$ (spinel).

The photoactivity of the pigments is within the range of customary commercial $TiO_2$ pigments.

The short-term weathering results in the water immersion test (1 layer system, conventional coating material) are very good. Grey scale values [DIN 54001; ISO Standard 105 Section A02 ]:

16 h/66° C.=5–4 and 20 H/80° C.=4–5.

Example 2

100 g of $SiO_2$ flakes (prepared in accordance with WO 93/08,237) are suspended in 2 l of dionized water and the suspension is heated to 75° C. A solution consisting of 12 g of $SnCl_4 \cdot 5H_2O$ and 40 ml of 37% HCl in 370 ml of water a a pH of 1.8 is metered in at a rate of 2 ml/min. During the addition, the pH is kept constant with 32% NaOH solution. After the end of addition of the $SnCl_4$ solution, stirring is carried out for 10 minutes and then 620 ml of $TiCl_4$ solution (410 g of $TiCl_4$/l of water) are metered in at a rate of 2 ml/min. During the covering operation, the pH is kept constant by adding 32% NaOH solution. After 30 minutes, the pH is adjusted to 7.0 with NaOH and a water glass solution (190 g of water glass diluted with 190 g of water) is metered in at a rate of 2 ml/min, the pH being kept constant by simultaneous addition of 10% HCl. After the end of the addition, stirring is continued at 75° C. for 15 minutes. The pigment is filtered off, washed free of salt, dried at from 60 to 180° C. and finally calcined at 800° C. for 60 minutes. After subsequent sieving, the product is again suspended in 1250 ml of deionized water. After a pH of 7.5 has been established, a solution of 100 g of $Co(NO_3)_2$ and 164 g of $AlCl_3 \cdot 6H_2O$ in 900 ml of water is added at a rate of 2 ml/min, the pH being kept constant with NaOH. The mixture is subsequently stirred for 30 minutes, filtered, washed and the solid product is washed free of salt, dried at from 60 to 180° C. and calcined at 1000° C.

A golden interference pigment having a blue mass tone is obtained.

The entire disclosure of all applications, patents and publications, cited above, and of corresponding German application No. 198 03 550.0 filed Jan. 30, 1998 is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A multilayer interference pigment having a blue mass tone, comprising a platelet-shaped carrier material and a coating which is formed from
   (i) a first layer of cobalt aluminate, cobalt-containing glass, tungsten bronzes or cobalt oxide,
   (ii) a second layer of colorless, transparent metal oxide of a first refractive index and
   (iii) a third, outer layer of a colorless, transparent metal oxide of a second refractive index higher than the first refractive index.

2. The interference pigment according to claim 1, wherein the platelet-shaped carrier material comprises natural or synthetic mica, phyllosilicates, glass plates, aluminum oxide platelets or silicon dioxide platelets.

3. The interference pigment according to claim 1, wherein the colorless, transparent metal oxide of high refractive index is titanium oxide, chromium oxide, iron oxide, zinc oxide, zirconium oxide or tin oxide.

4. The interference pigment according to claim 1, wherein the colorless, transparent metal oxide of low refractive index is silicon dioxide, boron oxide or aluminum oxide.

5. A process for preparing a pigment comprising a platelet-shaped carrier material coated with
   (i) a first layer of a colorless, transparent metal oxide of a first refractive index,
   (ii) a second layer of colorless, transparent metal oxide of a second refractive index lower than the first refractive index and (iii) a third, outer layer of cobalt aluminate, cobalt-containing glass, tungsten oxide or cobalt oxide, said process comprising:

suspending the platelet-shaped carrier material in water, heating the suspension, adding a water-soluble metal compound at a pH which is appropriate for hydrolysis, so that a metal oxide hydrate a first refractive index is precipitated onto the suspended carrier, the pH required for the precipitation of the respective metal oxide hydrate being established and kept constant by simultaneous addition of acid or base, subsequently adjusting the pH with a base to 4 to 10 and adding a water-soluble metal compound, so that a metal hydrate of refractive index lower than the first refractive index is precipitated onto the suspended carrier, the pH being kept constant by simultaneous addition of acid or base, and subsequently washing, drying and calcining resulting product, suspending the product in water and coating at a pH of from 3 to 10 with cobalt oxide hydrate, cobalt and aluminum oxide hydrate or cobalt and silicon oxide hydrate by addition and hydrolysis of the corresponding water-soluble metal compounds, the pH being kept constant by simultaneous addition of a base, or coating with an alkali metal tungstate and reducing said tungstate, and subsequently washing, drying and calcining product.

6. A process for preparing the pigments according to claim 1, comprising:

suspending the platelet-shaped carrier material in water, heating the suspension and coating at a pH of 3 to 10 with cobalt oxide hydrate, cobalt and aluminum oxide hydrate or cobalt and silicon oxide hydrate by addition and hydrolysis of the corresponding water-soluble metal compounds, the pH being kept constant by simultaneous addition of base, or coating with an alkali metal tungstate, and reducing said tungstate, subsequently adjusting the pH with a base to 4 to 10 and adding a water-soluble metal compound, so that a metal hydrate of a first refractive index is precipitated onto the suspended carrier, the pH being kept constant by simultaneous addition of acid or base, and adding a water-soluble metal compound at a pH suitable for hydrolysis, so that a metal oxide hydrate of a second refractive index higher than the first refractive index is precipitated onto the suspended carrier, the pH required for the precipitate of the respective metal oxide hydrate being established and kept constant by simultaneous addition of acid or base, and subsequently washing, drying and calcining product.

7. A process according to claim 5, wherein the platelet-shaped carrier material comprises natural or synthetic mica, phyllosilicates, glass flakes, aluminium oxide platelets or silicon dioxide platelets.

8. A process according to claims 5, wherein in that the colorless, transparent metal oxide of the first refractive index is titanium dioxide, zirconium dioxide or tin oxide.

9. A process according to claims 5, where the colorless, transparent metal oxide of the second refractive index is silicon dioxide or aluminium oxide.

10. A process according to claim 5, wherein following intermediate drying of the material to be coated the metal oxides are applied by CVD in a fluidized-bed reactor.

11. A method of using the a pigment according to claim 1 which comprises pigmenting paints, printing inks, plastics, cosmetics and glazes for ceramics and glasses with said pigments.

12. A method according to claim 11, wherein the pigments are employed as mixtures with a customary commercial pigments.

13. A method of using the pigments according to claim 1 which comprises incorporating said pigments in plastics and laser marking said plastics.

14. A paint, printing ink, plastic, cosmetic, ceramic or glass which has been pigmented with pigment according to claim 1.

15. A laser-markable plastic comprising a pigment according to claim 1.

16. A pigment according to claim 1, wherein the second layer has a thickness in the range of 70–110 nm, the first layer has a thickness in the range of 60–110 nm, and the third outer layer has a thickness in the range of 50–90 nm.

17. A pigment according to claim 1, wherein the refractive index of the second layer has a value in the range of 1.35 to 1.80 and the third layer has a refractive index of >1.80.

18. An interference pigment as in claim 1 wherein the thickness of the platelet shaped materials falls within the range of 0.05–5 $\mu$m.

19. The process according to claim 5, therein the suspension of carrier material is heated at 50 to 100° C.

20. The process according to claim 5, wherein drying is conducted at 60 to 180° C. and calcining at 500 to 1100° C.

21. The process according to claim 6, wherein the suspension of carrier material is heated at 50 to 100° C.

22. The process according to claim 6, wherein drying is conducted at 60 to 180° C. and calcining at 500 to 1100° C.

23. The process according to claim 6, wherein the platelet-shaped carrier material comprises natural or synthetic mica, phyllosilicates, glass flakes, aluminum oxide platelets or silicon dioxide platelets.

24. The process according to claim 6, wherein the colorless, transparent metal oxide of the second refractive index is titanium dioxide, zirconium dioxide or tin oxide.

25. The process according to claim 6, wherein the colorless, transparent metal oxide of the first refractive index is silicon dioxide or aluminum oxide.

26. The process according to claim 6, wherein following intermediate drying of the material to be coated, the metal oxides are applied by CVD in a fluidized-bed reactor.

* * * * *